Nov. 28, 1939.   A. L. MURRAY   2,181,379
METHOD OF FORMING CEMENT-ON RUBBER SOLES
Filed Nov. 11, 1937
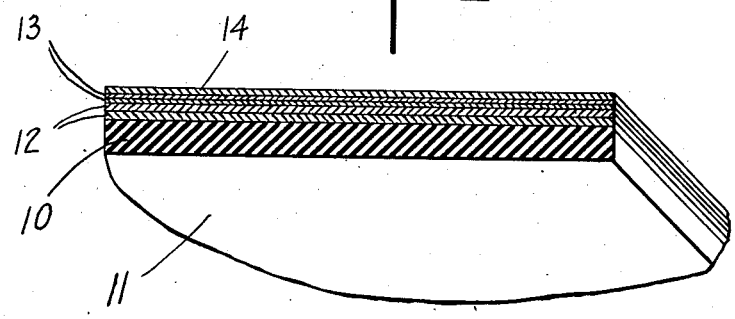
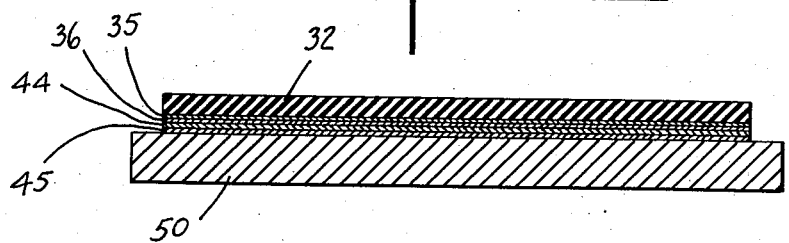
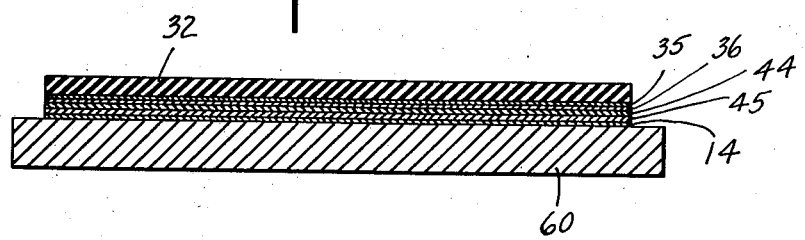
INVENTOR.
ALBERT L. MURRAY.
BY Lockwood Goldsmith & Galt
ATTORNEYS.

Patented Nov. 28, 1939

2,181,379

UNITED STATES PATENT OFFICE 2,181,379

METHOD OF FORMING CEMENT-ON RUBBER SOLES

Albert L. Murray, Auburn, Ind.

Application November 11, 1937, Serial No. 173,968

7 Claims. (Cl. 154—40)

This invention relates to the production of a rubber sole or a rubber heel suitable for attachment to the sole or heel, respectively, of a shoe for repair and replacement purposes, or for the original building of new shoes, such sole or heel unit being what is commonly known as the cement-on type.

In the manufacture of soles of this general character there has been incorporated a suitably vulcanized tread layer to one side of which (commonly called the back side) is attached one or more layers of rubber containing little or no vulcanizing ingredients, with the result that this backing layer or layers become contact vulcanized to the tread-layer where the two rubber portions come into contact, while the remaining exposed side of the backing rubber portion remains in a raw and unvulcanized condition with its surface of sufficiently soft and tacky nature so that when rubber cement (consisting of raw rubber and a solvent) is applied thereto, the solvent has the power, before it evaporates, to dissolve enough of the face of the backing rubber to which it is applied so that when the solvent is evaporated the film of rubber left by the cement has become inseparable and homogeneous with the softened portion of the backing rubber.

To attach the aforesaid sole or heel unit to the sole or heel of a shoe, rubber cement is applied to the shoe sole or heel and to the so-called cement-on sole or heel, which cement-on sole or heel is then placed in contact with the shoe after enough time has elapsed for the cement surfaces to have become dried enough to no longer be slimy and, therefore, to be in what is known as a "tacky" condition. The result is then such that the raw rubber film left on the sole or heel of the shoe and the film left by the cement on the cement-on article, become homogeneous and inseparable under any strain less than that amount which would be necessary to actually tear raw rubber.

In the above described method of making and applying cement-on soles there are several forms of what is commonly termed the raw rubber backing, which are here described and clarified to obtain a clearer and proper understanding of the improvement brought by the invention hereinafter described.

One way of producing the raw rubber backing (as set forth in Murray Patents Nos. 1,577,349 and 1,624,500) is to mill and calender the raw rubber into sheets of suitable thickness which is then applied either to the uncured tread rubber or to the protection sheet of special paper or holland cloth. The raw rubber then, in either case, is placed in contact with the vulcanizable tread rubber and the two then joined inseparably in the process of curing them together in a regular vulcanizing press. Under this method the fact that the raw rubber backing sheets have been necessarily milled until soft enough to be received and sheeted by the calender results in this raw rubber thereafter being moderately soft and always in a tacky condition so that when rubber cement is applied to it, the solvent quickly "cuts" this milled raw rubber sufficiently so that the deposit of raw rubber from the cement becomes homogeneous therewith.

Due to the fact that the raw rubber backing is somewhat softened by the milling process, extra holding power is obtained by using a sheet of some appreciable thickness such as .005". This provides, because of the above appreciable thickness, for the flexing movement of the shoe to be absorbed by the raw rubber backing. Thus, the strains of this flexing movement starting with the comparatively hard tread rubber are absorbed and taken up throughout the raw rubber backing and, therefore, dispelled or reduced before they reach the rubber cement deposit in and on the sole or heel of the shoe.

It should be understood here that the above milled raw rubber is commonly made by the milling of what is called "first latex" or crepe rubber, this being of somewhat harder rubber than such other grades as "smoked-sheets", "amber crepe", "roll-brown" and the like.

Another method of producing raw rubber backing, as set forth in Keiser Patent No. 1,533,008, consists of using unmilled latex or crepe rubber in the form of what is known as pale thin crepe sheets just as they come from the plantations. This method has not been practical commercially due to the fact that commercial crepe rubber comes in bales with the sheets tightly packed together, folded many times, and with many different widths and thicknesses; so that the labor of separating it into sizes necessary to fit the soles is excessively expensive, as is also any method of having the sheets specially made at the plantation into the desired size and thickness, with the attendant extreme long delays necessary to obtain such specified material from distant plantations. In this method the thin pale sheets of crepe or latex rubber are laid in contact with the tread rubber, and the two are put through the vulcanizer together. In the above named patent the use of two layers is required, which again makes an unnecessary heavy expense.

Irrespective of expense, however, and even if one layer could be used and obtained readily in the right thickness, the use of unmilled crepe rubber has one well proved disadvantage that interferes with its successful use in soles or heels to be applied by the public who are unskilled in rubber handling.

This objection consists in the fact that unmilled rubber (whether in the form of pale thin crepe sheets above described or otherwise) is difficult and slow to dissolve or be "cut" by the action of a solvent during the comparatively brief time it takes that solvent to evaporate when applied as a part of a coating, or rubber cement.

The common and unfortunate result, therefore, of using unmilled latex is that no adequate union is produced between the shoe and replacement unit for the soles and heels, therefore, soon comes off or separates from the shoe sole or heel. While it is true that a highly skilled operator fully understanding the nature and difficulty of sufficiently dissolving latex in the above form could probably produce a union by working the cement over the surfaces for an unusually long period, yet this requirement in the application is out of manufacturers' power and beyond the common understanding of the bulk of the consumers who apply these replacement soles and heels to their own shoes, having had no previous rubber experience. Therefore, this lack of ready dissolvability of the form of unmilled rubber prevents any successful commercial use thereof.

The successful method, the subject matter of this invention, consists in using milk of latex preferably in the form of concentrated latex, consisting of about 60% pure rubber. A practical way of applying this liquid latex is to spray it on the hot plate on which the soles or heels are to be vulcanized. This results in evaporating the liquid almost instantly, and the result is a film about .0015" thick. By the application of a second spray of latex the thickness increases to about .0025" and greater thicknesses can be obtained by further spray applications up to the point when the time required to evaporate sufficiently by reason of the cooling of the plate would be excessively slow.

The practical application of this last method lies in the fact that using only a one-coat spray, the quantity of rubber is reduced over two-thirds as compared with the necessary or desirable .005" thickness of milled raw rubber mentioned. In addition the cost of milling and calendering is saved. Still further, the special paper or other protective material which is necessary to use in molding to prevent the milled raw rubber soles or heels from sticking so tight to a hot plate that they can not be removed therefrom, becomes unnecessary since the unmilled latex in either sheet or milk of latex form does not stick to this plate. Consequently, the paper can be applied afterwards and can be of a lower cost nature (such as paraffin paper) which would not stand the heat and pressure used in the press for vulcanizing and/or molding. Also, all wrinkling and the consequent necessity of removing the protective backing material in order to smooth it out, which occurs when this paper or cloth material goes through the press, is avoided.

This novel method produces a so-called "raw rubber" layer made preferably in the form of two sprays of latex producing approximately .0025" thickness, which in addition to its lower cost, has the advantage that the unmilled latex has greater strength than the same grade of latex rubber milled, due to its not having been put through the well known breaking-down or tensile strength reducing action of the milling operation.

Under this novel method so far described, however, there is still the disadvantage or objection to practical commercial use that the unmilled latex is not readily attacked by the solvents of cement, so the film of rubber deposited by cement when applied by the consumer fails to become homogeneous and separation subsequently results by the rubber cement film easily pulling away from the sole backing rubber.

The present invention, therefore, consists in the further extension of the process last described. This has been found by practice to completely overcome this difficulty of unmilled raw rubber not being readily attacked by the solvents of rubber cement.

There is first brushed, sprayed or otherwise applied on the vulcanizing press plate, a coat of regular rubber cement consisting of rubber and a solvent, the rubber having been either milled or unmilled before it is placed in the solvent, but having been soaked or churned in the solvent until dissolved (which soaking or churning produces the same or similar breakdown as milling) with the result that the rubber film deposited on the plate has the same receptivity to rubber cement solvent as milled raw rubber. There is then applied, usually by spraying, one or more coats of concentrated milk of latex (as previously set forth) on to the film of rubber cement. The manufacture of the replacement soles or heels is then completed by laying on the curable tread rubber and the mold on the backing deposits, and then the assemblage is put through the vulcanizing process as a unit.

Since rubber cement, consisting of rubber and a solvent, usually contains on 6% or 7% of rubber, against the 60% of concentrated milk of latex, the film of rubber deposited first by the evaporation of the solvent of the rubber cement is extremely thin. Thus, the total amount of rubber used in the "raw rubber" layer can be kept down to not more than half the amount of rubber necessary to produce the .005" thickness of milled rubber, "raw rubber" layer, and there is retained the greater strength of unmilled rubber which is sufficient to balance the lesser thickness used. There is then obtained a surface upon the backing which insures a perfect union the same as is obtained with milled raw rubber. Further, by adding a greater number of coats of concentrated milk of latex, it is possible instead of making a saving in cost, to produce a stronger union without exceeding the cost of milled rubber.

Heels are mentioned herein as well as soles, because in certain types of heels such as are used on some women's shoes, the heel body is made of leather faced with a thin rubber heel. The invention is, therefore, just as adaptable for the applying of rubber heels as to soles. It is also adaptable for the applying of men's rubber heels directly to an underlying leather or rubber sub-heel, or direct to the back part of the sole where no intermediate member is used. Since the invention also secures rubber to rubber fully as well as the leather, the specific description to use between rubber and leather is not to be considered the sole use of this invention.

While there has been mentioned the preferred manner of applying rubber cement or rubber latex (such as spraying on a hot plate), the invention is not limited to that exact method since it is evident that the cement or latex can either be brushed or spread on and also that the applications are not limited to being applied to the hot vulcanizing plate, but can be applied in any other acceptable way, such as applied to the protection paper or cloth, or to the tread rubber itself. The applications to produce the raw rubber backing are all done very simply and quickly and do not interfere with rapidity of production. While the words "raw rubber" have been used throughout as applied to the backing material, this is intended to mean rubber free from any material amount of vulcanizing agents so that it will stay tacky and cement-receptive after going through vulcanizing heat. Any minute degree of vulcanization not sufficient to destroy tackiness is permissible, especially in view of the fact that the thin surface film of this invention will be particularly tacky and free from vulcanizing agents.

Other features of the invention will be apparent from the following description and claims and the accompanying drawing:

In the drawing, Fig. 1 is a longitudinal sectional-perspective view of a sole (or heel) embodying the article form of the invention.

Fig. 2 is a sectional view of a portion of apparatus with the rubber material thereon and which is utilized in the production of the article by a second species of the generic process which may be employed to produce the article shown in Fig. 1.

Fig. 3 is a view similar to Fig. 2 and of a slightly modified form.

In Fig. 1 of the drawing 10 indicates a homogeneous layer of vulcanizable stock from which is formed, when the sole is completed, the tread portion thereof and on one face of the same may be formed any suitable design or pattern. There is herein illustrated a plurality of independent layers of raw rubber which is not milled, although in the completed article the several layers are uniformly secured together throughout their contacting areas.

Herein two such layers 12 are illustrated and are formed of 60% liquid latex—otherwise known as milk of latex, and from which the liquid solvent has been removed. Each layer is approximately .0015" thick, thus two applications of the material, one following the other, produce a resultant thickness of raw rubber derived from milk of latex or unmilled character and, therefore, unweakened, with a thickness of .003" and having a tensile strength equivalent to that of raw milled rubber approximately .005" to .006".

One or more layers 13 of raw rubber which is readily cement-receptive, maybe provided. Herein two such layers are shown merely by way of example. Each layer is approximately .0002" in thickness, resulting in a total thickness if two layers are employed, of .0004". A suitable protective covering 14 of holland or other suitable material protects the tacky raw rubber surface against oxidation, film formation, dirt and the like.

The dried latex portion 12 shown in Fig. 1 provides a block preventing migration of vulcanization from the tread portion 10 to the raw rubber portion 13, which is readily cement-receptive. It is, of course, to be understood that, in forming the layer 13 by one or more applications of rubber cement, the solvent is evaporated from each application of cement.

In Figs. 2 and 3, a modified form of the generic invention is illustrated. In this form of the invention, there is indicated, as shown in Fig. 2, a mold plate 50 which is hot as a result of previous use in the press or as a result of the initial conditioning of the press at the beginning of the day's manufacture, or after the lunch hour.

To the surface of this hot plate, there is applied one or more layers of rubber cement by spraying or the like and these layers are indicated by numerals 44 and 45, the layer in contact with the plate being designated by the numeral 45 and the next one, if utilized, being designated by the numeral 44. After each application of rubber cement the solvent is evaporated by reason of the heat in the plate, as well as by air circulating about the same. Such circulation may be positive in character, if desired.

Following the application of the rubber derived from rubber cement, one or more layers of raw rubber derived from milk of latex are then applied. These layers likewise are designated by the numerals 36 and 35, layer 36 being applied in contact with layer 44 or layer 45, if only one rubber cement layer is utilized. Of course, after each application of milk of latex derived from rubber, the solvent or liquid portion is evaporated therefrom, this being facilitated by the heat residual in the mold plate and transmitted thereto through the raw rubber layer derived from rubber cement.

Following the building up of these two rubber latex layers, there is applied to layer 35 a layer of tread stock 32. This stock is of vulcanizable character. It is also of milled rubber or other rubber material suitable for forming the resultant tread portion of the completed shoe sole or heel. The plate with the several layers thus intimately associated is then put into the press and subjected to sufficient heat and pressure to vulcanize the tread stock to the desired degree and to unite through heat and pressure and by a vulcanized union the tread stock to the milk of latex derived rubber layer.

The heat and pressure are sufficient to homogeneously and satisfactorily unite the cement derived raw rubber layer to the milk of latex derived rubber layer. After the formation of the sole or heel, the protective covering may be applied to the material and the unit may be trimmed following removal of the completed sole or heel from the plate.

In Fig. 3 a further modified form of the invention is illustrated and is designated by appropriate numerals. The hot mold plate has applied thereto a protective covering such as holland, paper or the like 14 (see the same in Fig. 1). There is then applied, as previously described with reference to Fig. 2, the successive rubber layers—to wit, as illustrated herein two raw rubber layers which are cement-receptive and derived from rubber cement, these being indicated by the numerals 45 and 44, respectively, and the milk of latex derived rubber layers 36 and 35, respectively, and the tread rubber layer 32.

The operation or processing to completion is the same as that previously described with reference to Fig. 2, except that the step of applying the protective covering after the layers are united is, of course, unnecessary and omitted.

The basic process only produces the article shown in Fig. 1 and such article has all of the advantages of prior shoe soles or heels utilized for the same purpose for which this invention is intended and none of the disadvantages thereof and has the further advantage that the same strength is obtained with less rubber material and it has the further advantage that the cost of milling certain of the layers is eliminated and the cost of calendering the layers one to the other is eliminated.

While the invention has been described in great detail in the foregoing specification and similarly illustrated in the drawing, the same is to be considered as illustrative and not restrictive in character.

The several modifications of the process invention herein disclosed, as well as others, both as to the process and product resulting therefrom, which will readily suggest themselves to persons skilled in this art, are all considered to be within the broad scope of the invention, reference being had to the appended claims.

The invention claimed is:

1. In the process of forming a rubber unit such as a sole or heel suitable for shoe repair purposes, the combination of forming a layer of relatively thin raw rubber derived from rubber cement substantially free from surface skin and evaporating the liquid therefrom, forming a layer of relatively unweakened, relatively tough rubber free from vulcanizing agents and having skin forming tendencies and derived from rubber latex and evaporating the liquid therefrom, the rubber latex comprising concentrated milk of latex in an amount sufficient to prevent migration of vulcanization therethrough, forming a layer of vulcanizable tread stock, the unweakened latex rubber layer being between the other cement rubber and tread stock layers, and then permanently consolidating the layers by heat and pressure, the heat vulcanizing the tread layer and vulcanizing the intermediate layer thereto, the latter preventing migration of vulcanization to the thin, cement-derived raw rubber layer.

2. In the process of forming a rubber unit such as a heel or sole for shoe repair purposes, the combination of forming upon a hot plate a relatively thin layer having the desired thickness and of relatively pure rubber free from skin effect by applying to the plate concentrated rubber cement, the heat in the plate evaporating the solvent therefrom, then applying to the thin layer a relatively thicker rubber layer having the desired thickness and including an evaporable liquid, the plate heat evaporating the liquid therefrom, then applying to the thicker intermediate layer, tread rubber vulcanizable stock, and then permanently consolidating all the rubber by heat and pressure.

3. A process as defined by claim 2, characterized by the preliminary step of covering the rubber supporting face of the plate with a rubber protecting covering such as holland, paper and the like.

4. A process as defined by claim 2, characterized by the formation of the relatively thin layer upon the hot plate being obtained by the successive applications of the rubber cement.

5. A process as defined by claim 2, characterized by the formation of the intermediate layer by the successive applications of concentrated milk of latex.

6. A process as defined by claim 2, characterized by the formation of the relatively thin layer upon the hot plate being obtained by the successive applications of the rubber cement, and by the formation of the intermediate layer by the successive applications of concentrated milk of latex.

7. A process as defined by claim 2, characterized by the first and second mentioned applications being a spraying operation.

ALBERT L. MURRAY.